US 8,014,245 B2

(12) United States Patent
Chen et al.

(10) Patent No.: US 8,014,245 B2
(45) Date of Patent: Sep. 6, 2011

(54) SYSTEM AND METHOD OF DEFECT DESCRIPTION OF A DATA STORAGE MEDIUM

(75) Inventors: HuaYuan Chen, Singapore (SG); Bo Wei, Singapore (SG); YongPeng Chng, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 594 days.

(21) Appl. No.: 11/843,879

(22) Filed: Aug. 23, 2007

(65) Prior Publication Data

US 2009/0052289 A1 Feb. 26, 2009

(51) Int. Cl.
*G11B 7/00* (2006.01)
(52) U.S. Cl. .................................... 369/53.17
(58) Field of Classification Search .............. None
See application file for complete search history.

(56) References Cited

U.S. PATENT DOCUMENTS

| | | |
|---|---|---|
| 5,541,903 A | 7/1996 | Funahashi et al. |
| 6,025,966 A | 2/2000 | Nemazie et al. |
| 6,223,303 B1 | 4/2001 | Billings et al. |
| 6,496,943 B1 | 12/2002 | Belser et al. |
| 6,654,904 B1 | 11/2003 | Andoh et al. |
| 6,710,958 B2 | 3/2004 | Wyatt |
| 6,985,319 B2 | 1/2006 | Yip et al. |
| 6,990,607 B2 | 1/2006 | Sim et al. |
| 6,993,678 B2 | 1/2006 | Cheok et al. |
| 7,050,369 B2 | 5/2006 | Lee et al. |
| 7,072,129 B1 | 7/2006 | Cullen et al. |
| 7,139,145 B1 | 11/2006 | Archibald et al. |
| 7,188,226 B2 | 3/2007 | de Brebisson et al. |
| 2005/0138464 A1 | 6/2005 | Chong et al. |
| 2006/0171280 A1 | 8/2006 | Chiang et al. |
| 2007/0101211 A1 | 5/2007 | Chiang et al. |

*Primary Examiner* — Wayne Young
*Assistant Examiner* — Brian Butcher
(74) *Attorney, Agent, or Firm* — Theodore M. Magee; Westman, Champlin & Kelly, P.A.

(57) ABSTRACT

The disclosure is directed toward systems and methods of defect description of a data storage medium. In a particular embodiment, a method includes determining a first defect of a data storage medium. The method also includes determining a format of an entry of a defect description table based on the first defect and a location of a second defect of the data storage medium. The format is selected from one of a plurality of formats. The method also includes storing a description of the first defect in the entry of the defect description table in the format.

17 Claims, 7 Drawing Sheets

SYSTEM AND METHOD OF DEFECT DESCRIPTION OF A DATA STORAGE MEDIUM

BACKGROUND

The present disclosure is generally related to defect description of a data storage medium. During a manufacturing certification process of a data storage medium, defective sectors can be identified and recorded in a defect description table (DDT). If a storage size allocated for a defect description table does not have sufficient capacity to record all of the defective sectors, the data storage medium may be rejected during the manufacturing certification process.

As data storage medium capacities increase with the introduction of new storage technology, the total number of defective sectors that need to be identified in the DDT increases. For example, a physically damaged media area of the data storage medium may yield more defective sectors with increased capacity for tracks per inch (TPI) or bytes per inch (BPI) on the media. All defective sectors typically need to be recorded in the defect description table, but the space requirements for recording all of the defective sectors in increasingly large data storage mediums may be more of a problem as capacities increase.

One solution to the increasing capacity requirements of defect description tables may be to increase the storage size allocated for the defect description table. However, defect description tables and user cache may both make use of buffer memory of a data storage device and unless the buffer memory is increased in size, a larger defect description table may reduce the amount of the user cache that that is available for the buffer memory. Additionally, increasing the size of the buffer memory may increase the cost of the data storage device. Cache performance may also suffer if the size of the defect description table is increased. Therefore, there is a need for an improved system and method of defect description of a data storage medium.

SUMMARY

In a particular embodiment, a method includes determining a first defect of a data storage medium and determining a format of an entry of a defect description table based on the first defect and a location of a second defect of the data storage medium. The format is selected from one of a plurality of formats. The method further includes storing a description of the first defect in the entry of the defect description table in the format.

DETAILED DESCRIPTION

The disclosure is directed toward systems and methods of defect description of a data storage medium. In a particular embodiment, a method includes determining a first defect of a data storage medium. The method also includes determining a format of an entry of a defect description table based on the first defect and a location of a second defect of the data storage medium. The format is selected from one of a plurality of formats. The method also includes storing a description of the first defect in the entry of the defect description table in the format.

In another embodiment, a method is disclosed that includes accessing a defect description table of a data storage medium. The defect description table includes defect description data in a plurality of distinct formats. Each entry of the defect description table has one of the plurality of distinct formats. Each of the plurality of distinct formats is based on a relationship between a location of a first defective portion of the data storage medium and a location of a second defective portion of the data storage medium. The method also includes determining when a portion of the data storage medium is defective based on the defect description table.

In another embodiment, a device is disclosed that includes a transducer operable to read data from a data storage medium. The device also includes a controller adapted to receive the data via the transducer and determine when a portion of the data storage medium is defective based on defect description data. The defect description data includes at least one entry in a table and the at least one entry has one of a plurality of formats. At least one of the plurality of formats describes a relationship of a first defective portion of the data storage medium to a second defective portion of the data storage medium. The controller is adapted to process each of the plurality of formats.

In yet another embodiment, a computer readable medium having instructions to cause a processor to execute a method including accessing a defect description table of a data storage medium. The defect description table includes defect description data in a plurality of distinct formats. Each entry of the defect description table has one of the plurality of distinct formats. Each of the plurality of distinct formats is based on a relationship between a location of a first defective portion of the data storage medium and a location of a second defective portion of the data storage medium. The method also includes determining when a portion of the data storage medium is defective based on the defect description table.

Figure 1:
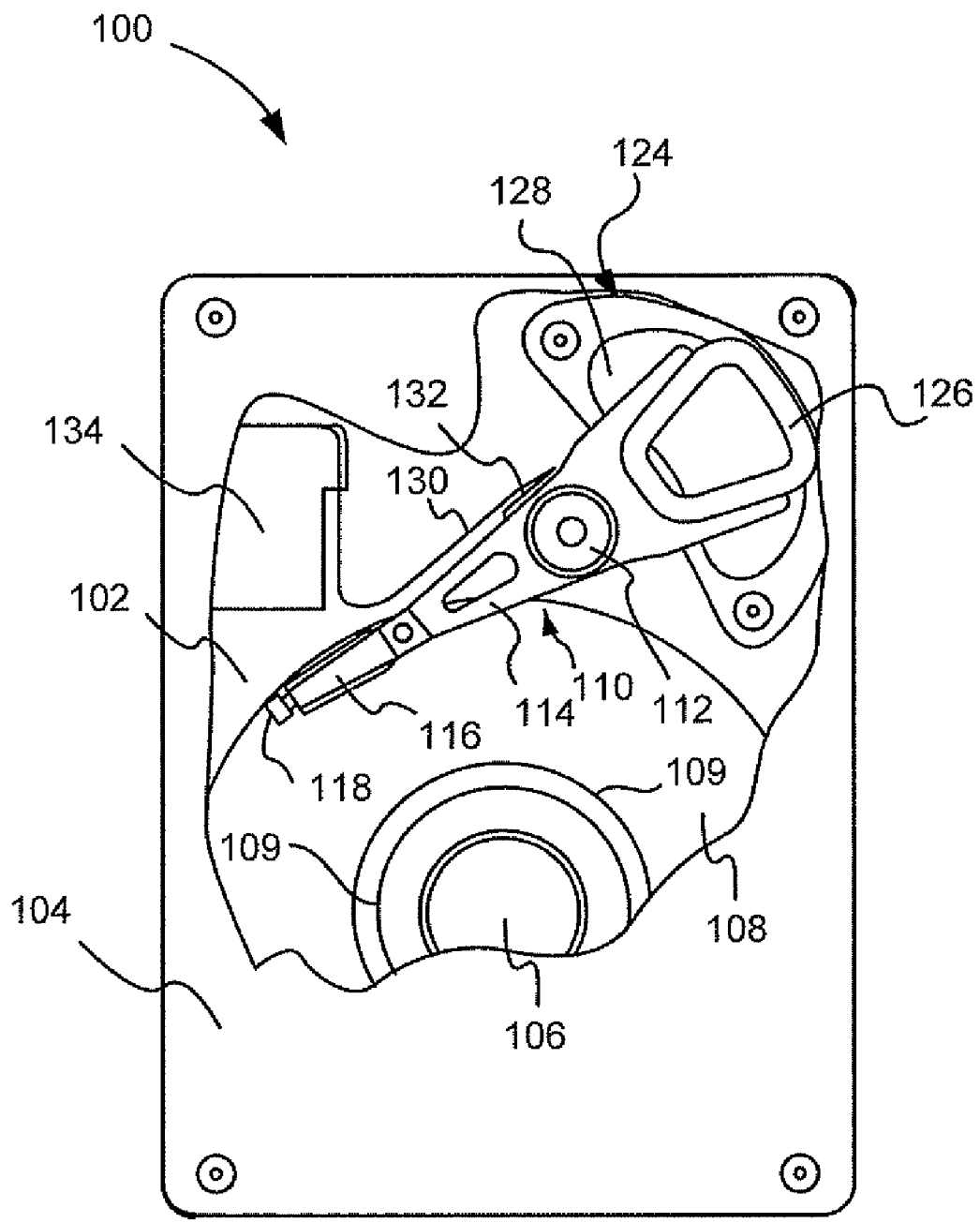
FIG. 1 is a cutaway view of an illustrative embodiment of a disc drive.

Referring to FIG. 1, in a particular embodiment, a disc drive 100 includes a base 102 to which various components of the disc drive 100 are mounted. A top cover 104, shown partially cut away, cooperates with the base 102 to form an internal, sealed environment for the disc drive. The components of the disc drive 100 include a spindle motor 106, which rotates one or more discs 108. Information is written to and read from tracks on the discs 108 through the use of an actuator assembly 110 that rotate about a bearing shaft assembly 112 positioned adjacent the discs 108. The actuator assembly 110 includes one or more actuator arms 114 that extend toward the discs 108, with one or more flexures 116 extending from the actuator arms 114. Mounted at the distal end of each of the flexures 116 is a head 118 including an air bearing slider (not shown) that enables the head 118 to fly in close proximity above the corresponding surface of the associated disc 108.

The track position of the heads 118 is controlled, during a seek operation, through the use of a voice coil motor (VCM) 124 that typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

A flex assembly 130 provides requisite electrical connection paths for the actuator assembly 110 while allowing pivotal movement of the actuator assembly 110 during operation. The flex assembly 130 can include a printed circuit board 132 to which head wires (not shown) are connected. The head wires may be routed along the actuator arms 114 and the flexures 116 to the heads 118. The printed circuit board 132 may include circuitry for controlling the write currents applied to the heads 118 during a write operation and a preamplifier (not shown) for amplifying read signals generated by the heads 118 during a read operation. The flex assembly 130 terminates at a flex bracket 134 for communication through the base 102 to a disc drive printed circuit board (not shown) mounted to the disc drive 100.

As shown in FIG. 1, a plurality of nominally circular, concentric tracks 109 are located on the surface of the discs 108. Each track 109 includes a number of servo fields that are interspersed with user data fields along the track 109. The user data fields are used to store user data, and the servo fields are used to store servo information used by a disc drive servo system to control the position of the heads 118.

Figure 2:
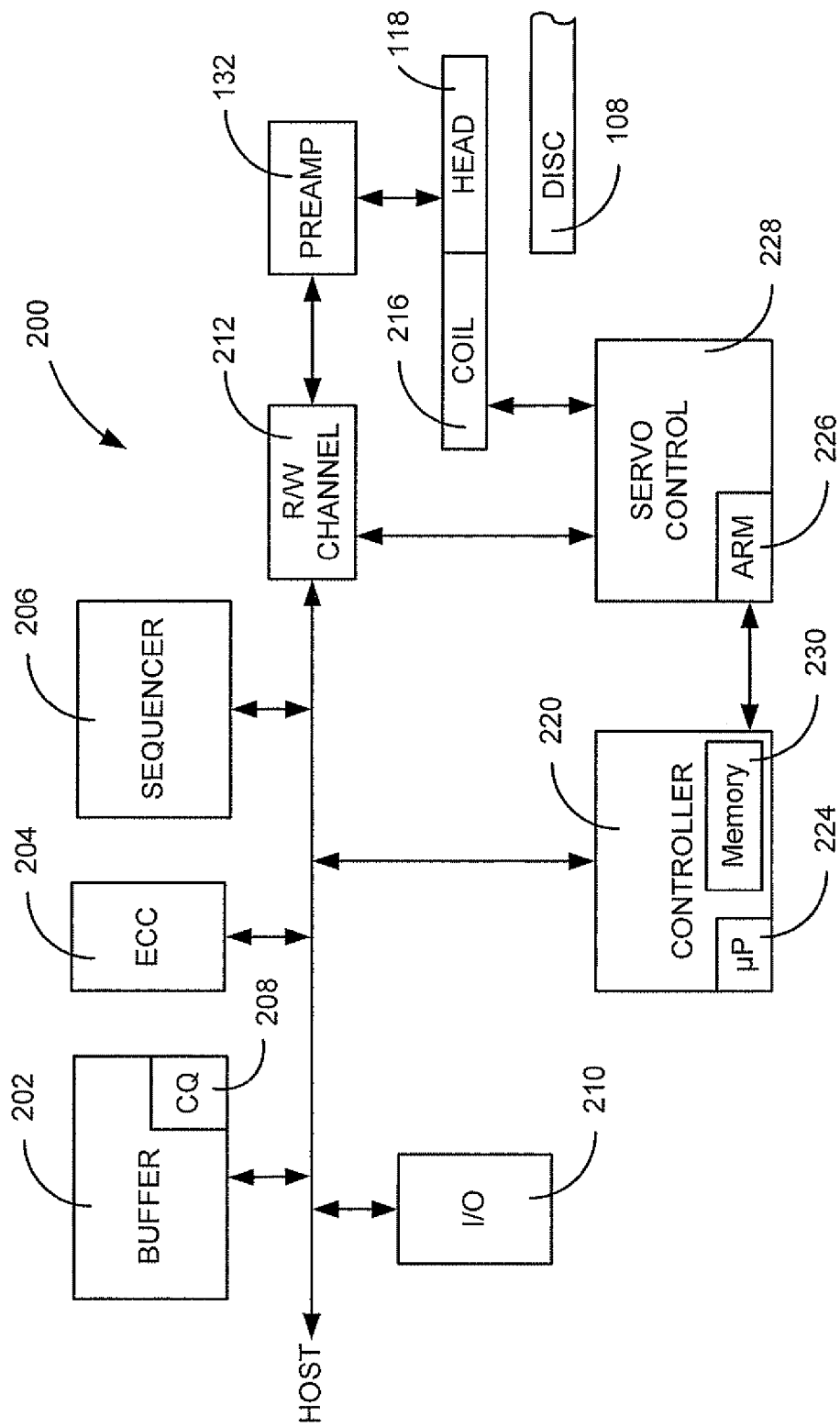
FIG. 2 is a block diagram of an illustrative embodiment of a disc drive system.

FIG. 2 provides a functional block diagram of the disc drive 100. A hardware/firmware based interface circuit 200 communicates with a host device (such as a personal computer, not shown) and directs overall disc drive operation. The interface circuit 200 includes a programmable controller 220 with associated microprocessor 224 and memory 230. In a particular embodiment, memory 230 is a first-in-first-out (FIFO) buffer. The interface circuit 200 also includes a buffer 202, an error correction code (ECC) block 204, a sequencer 206, and an input/output (I/O) control block 210.

The buffer 202 temporarily stores user data during read and write operations, and includes a command queue (CQ) 208 where multiple pending access operations are temporarily stored pending execution. The buffer 202 may be a volatile or non-volatile solid state memory device. The ECC block 204 applies on-the-fly error detection and correction to retrieved data. The sequencer 206 asserts read and write gates to direct the reading and writing of data. The I/O block 210 serves as an interface with the host device.

FIG. 2 further shows the disc drive 100 to include a read/write (R/W) channel 212 which encodes data during write operations and reconstructs user data retrieved from the discs 108 during read operations. A preamplifier/driver circuit (preamp) 132 applies write currents to the heads 118 and provides pre-amplification of readback signals.

A servo control circuit 228 uses servo data to provide the appropriate current to the coil 216 to position the heads 118. The controller 220 communicates with a processor 1226 to move the heads 118 to the desired locations on the discs 108 during execution of the various pending commands in the command queue 208.

During operation, the controller 220 may determine a first defective portion of the disc 108. The controller 220 may determine a format of an entry of a defect description table based on the first defective portion and a location of other defects on the disc 108. The format may be selected from one of a plurality of formats. The controller 220 may also store a description of the first defect in the entry of the defect description table in the format. The format may be based on which of the plurality of formats will result in a least number of entries in the defect description table.

In a particular embodiment, the defect description table may store defect location information in multiple defect description sub-tables. The defect description sub-tables may have unique formats for storing data to identify a defective location of the disc 108. The controller 220 may select a format for an entry in the defect description table that corresponds to one of the defect description sub-tables.

Figure 3:
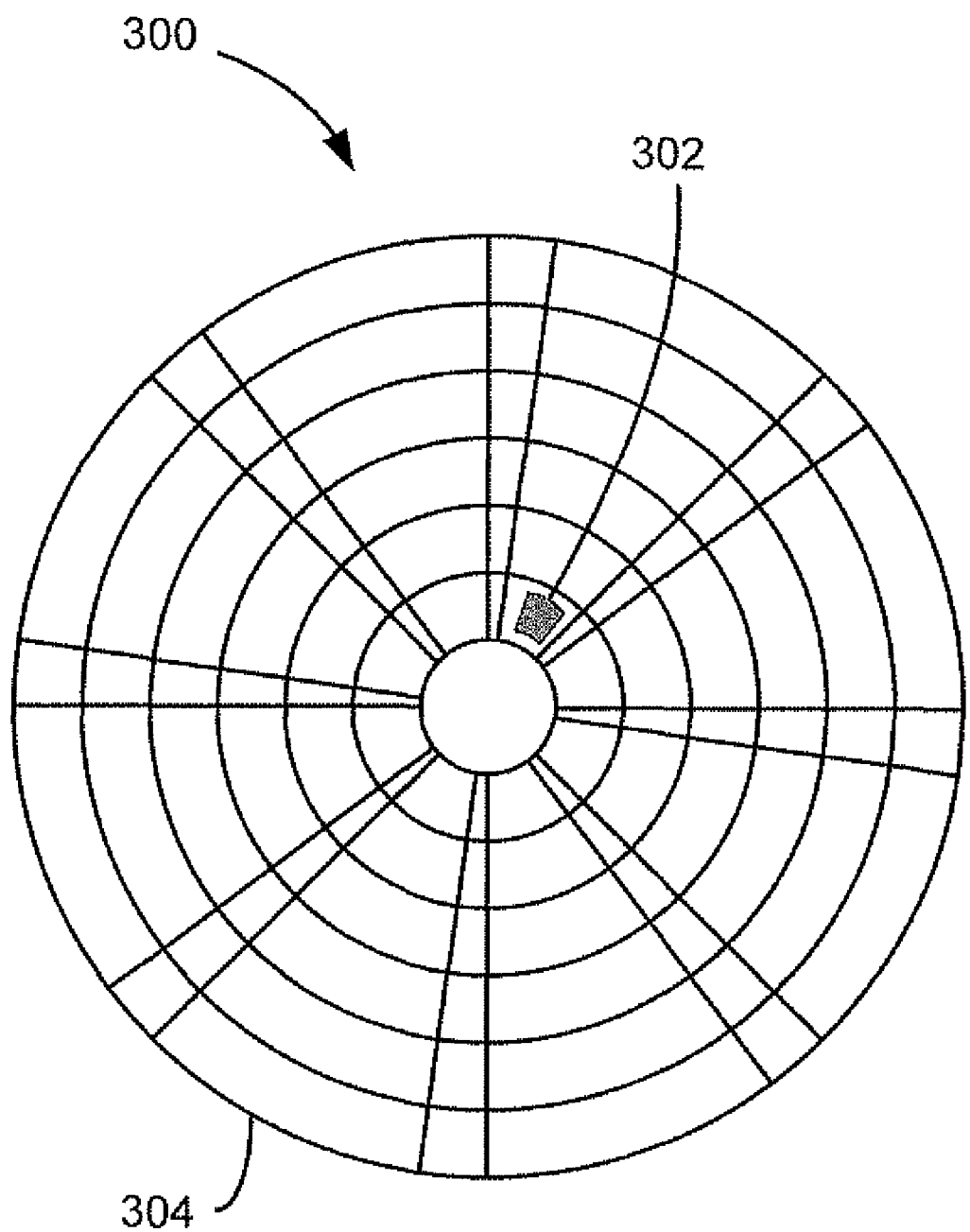
FIG. 3 is a diagram of a particular illustrative embodiment of a system of defect description of a data storage medium.

Referring to FIG. 3, an embodiment of a system of defect description of a data storage medium is depicted and generally designated 300. The system 300 includes a defect description table 302 that may be located in a dedicated system area of a data storage medium 304 of the system 300. The dedicated system area may be an area that may have a higher reliability than another area of the data storage medium 304. In another embodiment, the defect description table 302 may be stored in a solid state memory of a data storage device, such as the buffer 202 shown in FIG. 2. The solid state memory may be volatile or non-volatile.

In a particular embodiment, the data storage medium 304 may be a rotatable data storage medium including a plurality of tracks that each have a plurality of sectors to store data in. For example, the data storage medium 304 may be a magnetic data storage medium, such as one of the discs 108 of the disc drive 100 shown in FIG. 1. In another example, the data storage medium 304 may be an optical data storage medium, a magneto-optical data storage medium, or any other type of data storage medium that may need to have defect locations stored.

Figure 4:
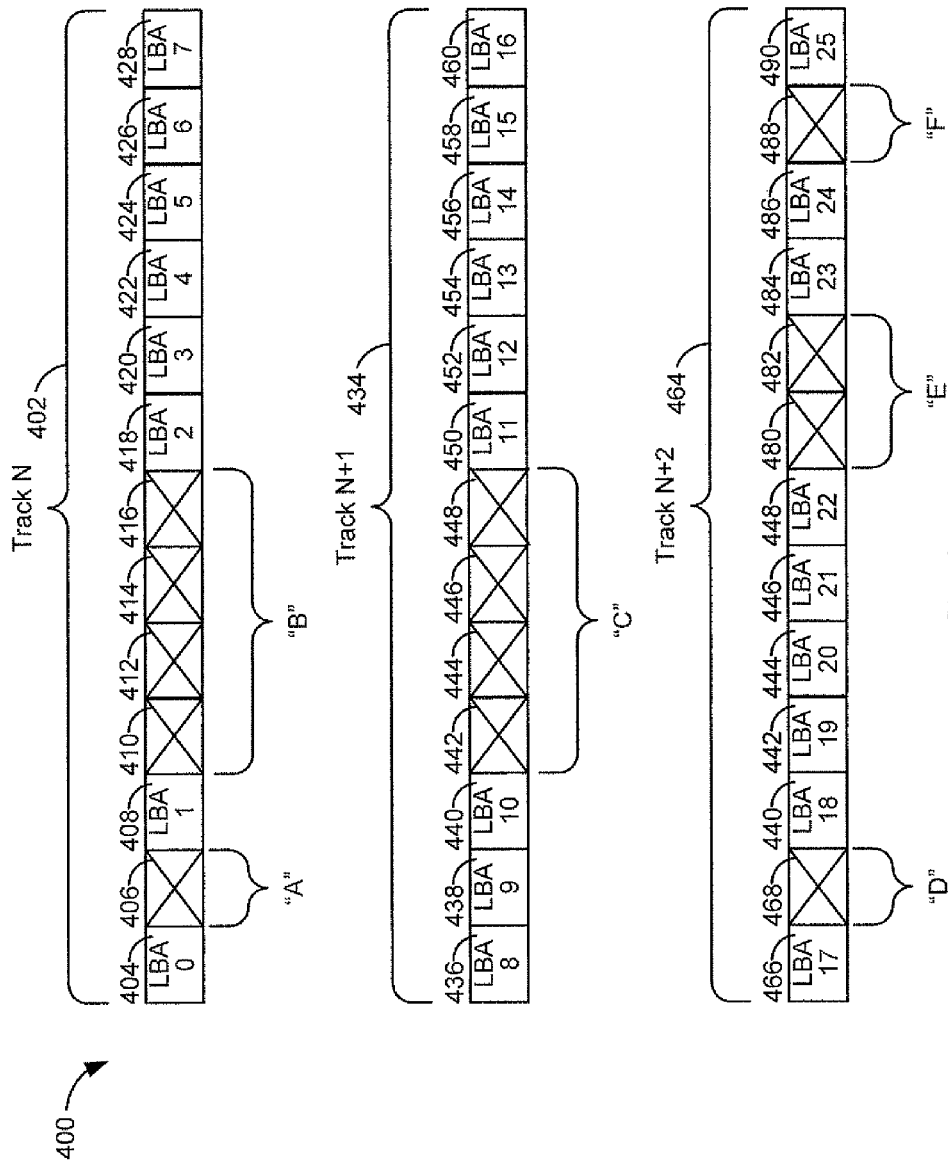
FIG. 4 is a block diagram representation of a data storage medium having defects.

Referring to FIG. 4, a block diagram representation of a data storage medium having defects is depicted and generally designated 400. In a particular embodiment, the data storage medium 400 may be a rotatable data storage medium including a plurality of tracks that each have a plurality of sectors to store data in. For example, the data storage medium 400 may be a magnetic data storage medium, such as the discs 108 of the disc drive 100 shown in FIG. 1. The data storage medium 400 may also be an optical data storage medium, a magneto-optical data storage medium, or any other type of data storage medium that may need to have defect locations stored. For example, the data storage medium 400 may be the data storage medium 304 shown in FIG. 3.

As shown, the data storage medium 400 includes a first track 402 designated "Track N". The first track 402 includes sectors 404-428. In the first track 402, sector 406 may be defective and may be designated as defect "A". In the first track 402, sectors 410, 412, 414 and 416 may be defective and that group of sectors may be designated as defect "B". Apparatus 400 also includes a second track 434 designated "Track N+1". The second track 434 includes sectors 436-460. In the second track 434, sectors 442, 444, 446 and 448 may be defective and that group of sectors may be designated as defect "C". Further, Apparatus 400 includes a third track 464 designated "Track N+2". The third track 464 includes sectors 466-490. In the third track 464, sector 468 may be defective and may be designated as defect "D". Also, in the third track 464, sectors 480 and 482 may be defective and that group of sectors may be designated as defect "E". Further, in the third track 464, sector 488 may be defective and may be designated as defect "F".

Figure 5:
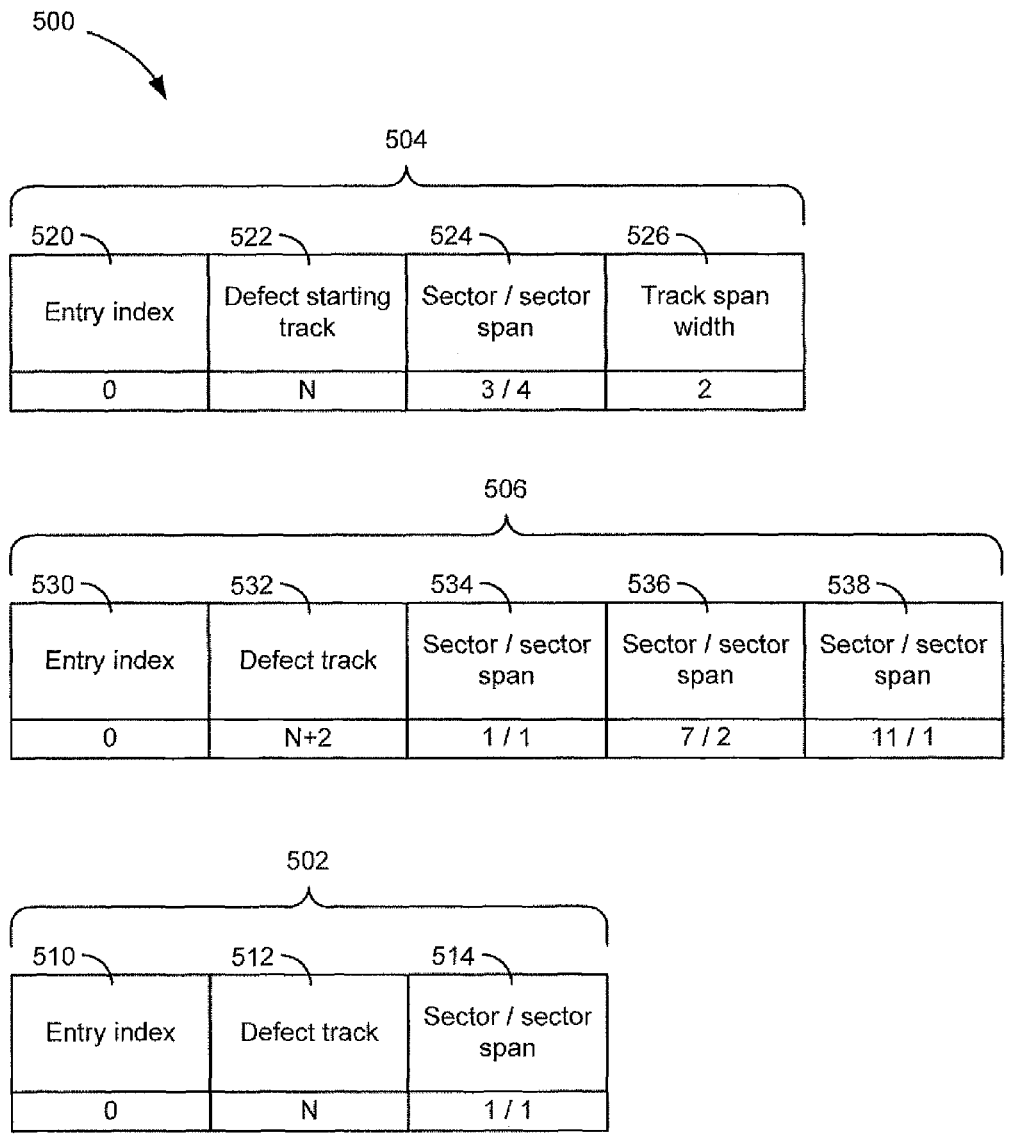
FIG. 5 is a block diagram representation of an embodiment of a data structure of a defect description of a data storage medium.

Referring to FIG. 5, a block diagram of an embodiment of a data structure of a defect description of a data storage medium is depicted and generally designated 500. The data structure 500 may be represented as a defect description table. The defect description table may include a first defect description sub-table 504, a second defect description sub-table 506, and a third defect description sib-table 502. The defect description sub-tables 502, 504, and 506 may have unique formats for storing data to identify a defect location of a data storage medium. A device that creates or modifies the defect description table may select a format that corresponds to one of the defect description sub-tables 502, 504, and 506 to store defect location information. The defect descriptions shown in the defect description sub-tables 502, 504, and 506 are based on the defects shown in the data storage medium 400 in FIG. 4.

The first defect description sub-table 504 may store defect information related to a defect that may span multiple adjacent tracks. The first defect description sub-table 504 may have multiple entries. The first defect description sub-table 504 may store, in a single entry, defect information that corresponds to several defective sectors in adjacent tracks that start from the same physical sector within their respective track and have identical or substantially similar sector span.

In a particular embodiment, the first defect description sub-table 504 may include an entry index field 520. The entry index field 520 may contain a unique identifier that provides each entry in the first defect description sub-table 504 with a unique identification. An example of an entry index for a first entry in the first defect description sub-table 504 may be zero "0" as shown in FIG. 5.

The first defect description sub-table 504 may also include a defect starting track field 522 that indicates a starting track of a series of multiple adjacent tracks that contain a defective sector. An example for defect "B" shown in FIG. 4 may have the defect starting track entry designated as "N" for the first track 402. Alternatively, the second track 434 in FIG. 4 may be chosen as the starting track.

The first defect description sub-table 504 may also include a sector/sector span field 524 that describes a starting position at which a defect starts in the track identified in the defect track field 522. The starting position may be described as a number of sectors offset from a point of the identified track, such as a start of a track. The sector/sector span field 524 also describes a number of consecutive sectors of the defect. The number of sectors may be one or more. An example of a sector/sector span entry that represents defect "B" and defect "C" shown in FIG. 4 may be "3/4" because both defects are offset into each track by three sectors and are four sectors in length.

The first defect description sub-table 504 may also include a track span width field 526 that describes a number of adjacent tracks that may be included in the entry for the defect description. The number of adjacent tracks may be based off of adjacent tracks that have an identical or substantially similar defect pattern. An example of a track span width entry may be "2" for defects "B" and "C" shown in FIG. 4 representing the number of adjacent tracks with an identical or substantially similar defect pattern.

The second defect description sub-table 506 may store, in a single entry, defect information related to multiple defects in a single track. The second defect description sub-table 506 may have multiple entries. In a particular embodiment, the second defect description sub-table 506 may be one sub-table with a specific number of defects per track. In another particular embodiment, the second defect description sub-table 506 may be may be multiple sub-tables each having a different number of defects per track. In the second defect description sub-table 506, a single entry may represent a plurality of defects on a single track.

In a particular embodiment, the second defect description sub-table 506 may include an entry index field 530. The entry index field 530 may contain a unique identifier that provides each entry in the second defect description sub-table 506 with a unique identification. An example of an entry index for a first entry in the third defect description sub-table 506 may be zero "0" as shown in FIG. 5.

The second defect description sub-table 506 may also include a defect track defect track field 532 that indicates a track that contains one or more defective sectors. An example of a defect track entry for defects "D", "E", and "F" shown in FIG. 4 shows the defect track designated as "N+2" for the third track 464.

The second defect description sib-table 506 may also include one or more sector/sector span fields 534, 536, and 538, each of which describes a starting position of a defect pattern and describes a number of defective consecutive defective sectors in each defect pattern. For example, a sector/sector span entry that represents the plurality of defects "D", "E", and "F" in the third track 464 shown in FIG. 7 may be "1/1" for defect "D", representing an offset of 1 and being 1 sector in length, "7/2" for defect "E", representing an offset of 7 and being 2 sectors in length, and "11/1" for defect "F", representing an offset of 11 and being 1 sector in length.

The third defect description sub-table 502 may store defect information related to a single defect in a single track. The third defect description sub-table 502 may have multiple entries related to single defects in different tracks.

In a particular embodiment, the third defect description sub-table 502 may include an entry index field 510. The entry index field 510 may contain a unique identifier that provides each entry in the third defect description sub-table 502 with a unique identification. An example of an entry index for a first entry in the first defect description sub-table 502 may be zero "0" as shown in FIG. 5.

The third defect description sub-table 502 may also include a defect track field 512 that indicates a track that contains a defective sector. An example for defect "A" shown in FIG. 4 shows the defect track entry designated as "N" for the first track 402.

The third defect description sub-table 502 may also include a single sector/sector span field 514 that describes a starting position at which a single defect starts in the track identified in the defect track field 512. The starting position may be described as a number of sectors offset from a point of the identified track, such as a start of a track. The sector/sector span field 514 also describes a number of consecutive sectors of the defect. The number of sectors may be one or more. An example of a sector/sector span entry that represents the defect "A" shown in FIG. 4 may be "1/1", representing an offset of 1 and being 1 sector in length.

In other embodiments, there may be more or less defect description sub-tables. For example, a defect description sub-table, similar to the third defect description sub-table 506, may contain a different number of sector/sector span fields, such as two sector/sector span fields or four sector/sector span fields.

In another particular embodiment, some defect descriptions may be able to use more than one format, e.g. sub-table. When this occurs, a format that achieves a greatest condensing effect compared to the other available formats may be used.

Figure 6:
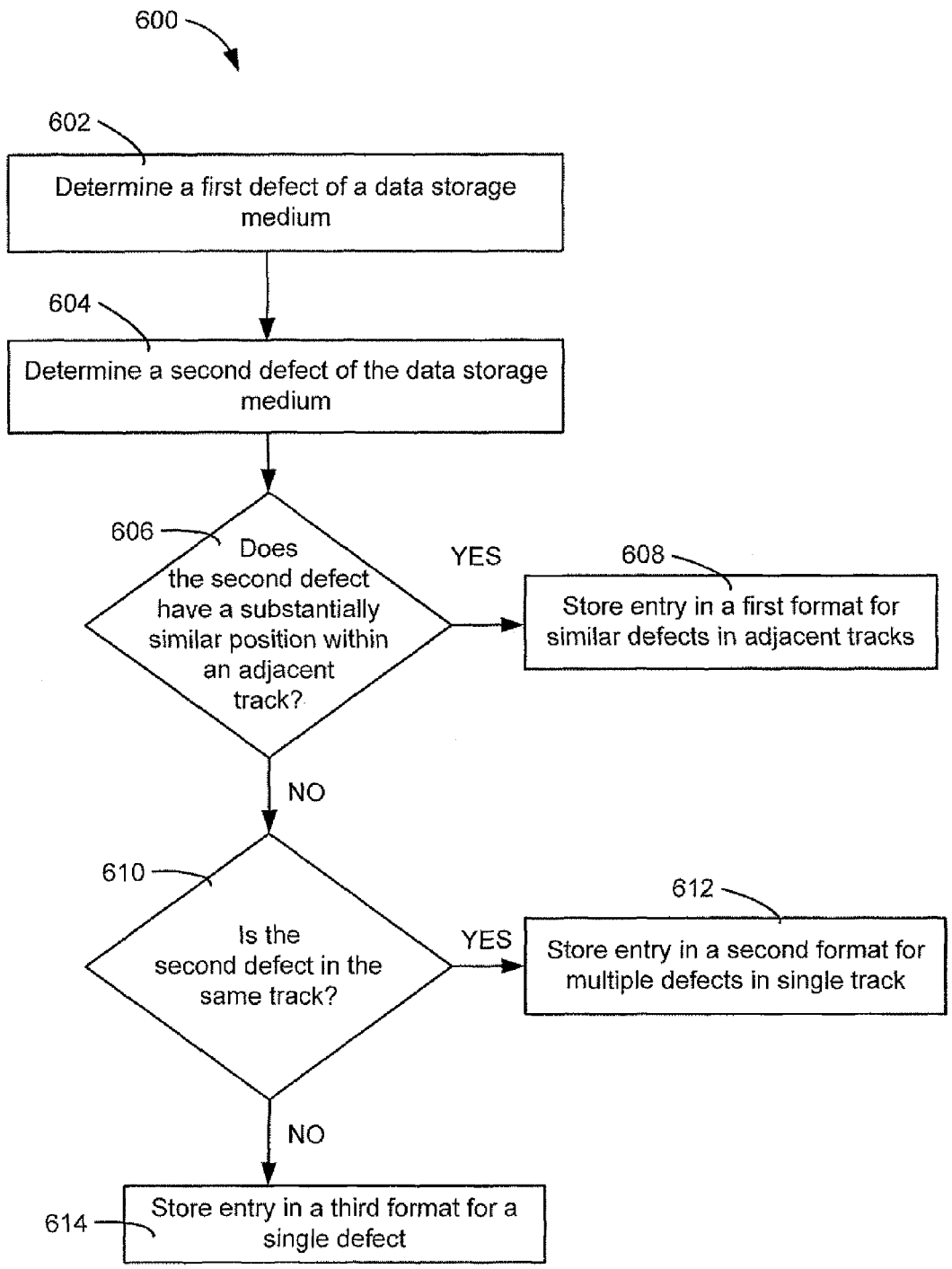
FIG. 6 is a flow diagram of an embodiment of a method of defect description of a data storage medium.

Referring to FIG. 6, a flow diagram of an embodiment of defect description of a data storage medium is depicted and generally designated 600. The method 600 may include determining a first defect of a data storage medium, at 602. The first defect may be detected by a data storage device or by another device during a manufacturing process of the data storage medium. The first defect may also be detected during operation of the data storage medium.

The method 600 may also include determining a format of an entry of a defect description table based on the first defect and a location of a second defect of the data storage medium. The format may be selected from one of a plurality of formats. The method 600 may also include storing a description of the first defect in the entry of the defect description table in the format. The format may be based on which of the plurality of formats will result in a least number of entries in the defect description table.

In a particular embodiment, the method 600 may include determining a second defect of the data storage medium, at 604. The method 600 may also include determining if the second defect has a substantially similar position within an adjacent track, at 606. When the second defect has a substantially similar position as the first defect within an adjacent track, the method 600 may store the description of the first defect in a first format, at 608. The first format may be selected for similar defects in a adjacent tracks. In a particular embodiment, a substantially similar position includes an identical starting location and an identical sector span.

In a particular embodiment, the first format may include a field for storing data that represents a unique identifier for each entry in the first format. The first format may also include a field for storing data that represents a track identification. The first format may further include a field for storing data that represents a starting position of one or more defective sectors on a first track and a number of consecutive sectors after the starting position that are defective on the first track. The first format may also include a field for storing data that represents a number of adjacent tracks having an identical one or more defective sectors.

When the second defect does not have a substantially similar position within an adjacent track, the method 600 may include determining if the second defect is in the same track as the first defect, at 610. When the second defect is in the same track as the first defect, the method 600 may store the description of the first defect in a second format, at 612. The second format may be selected for multiple defects in a single track.

In a particular embodiment, the second format may include a field for storing data that represents a unique identifier for each entry in the second format and a field for storing data that represents a track identification. The second format may also include multiple fields for storing data that represents a starting position of a defect on a track and a number of consecutive sectors after the starting position that are defective on the track.

When the first defect is not in the same track as the second defect, the method 600 may include storing the description of the first defect in a third format, at 614. The third format may be distinct from the first format and the second format. In a particular embodiment, the third format is a format selected for a single defect in a single track.

In a particular embodiment, the third format may include a field for storing data that represents a unique identifier for each entry in the third format and a field for storing data that represents a track identification. The third format may also include a field for storing data that represents a single defective sector.

Figure 7:
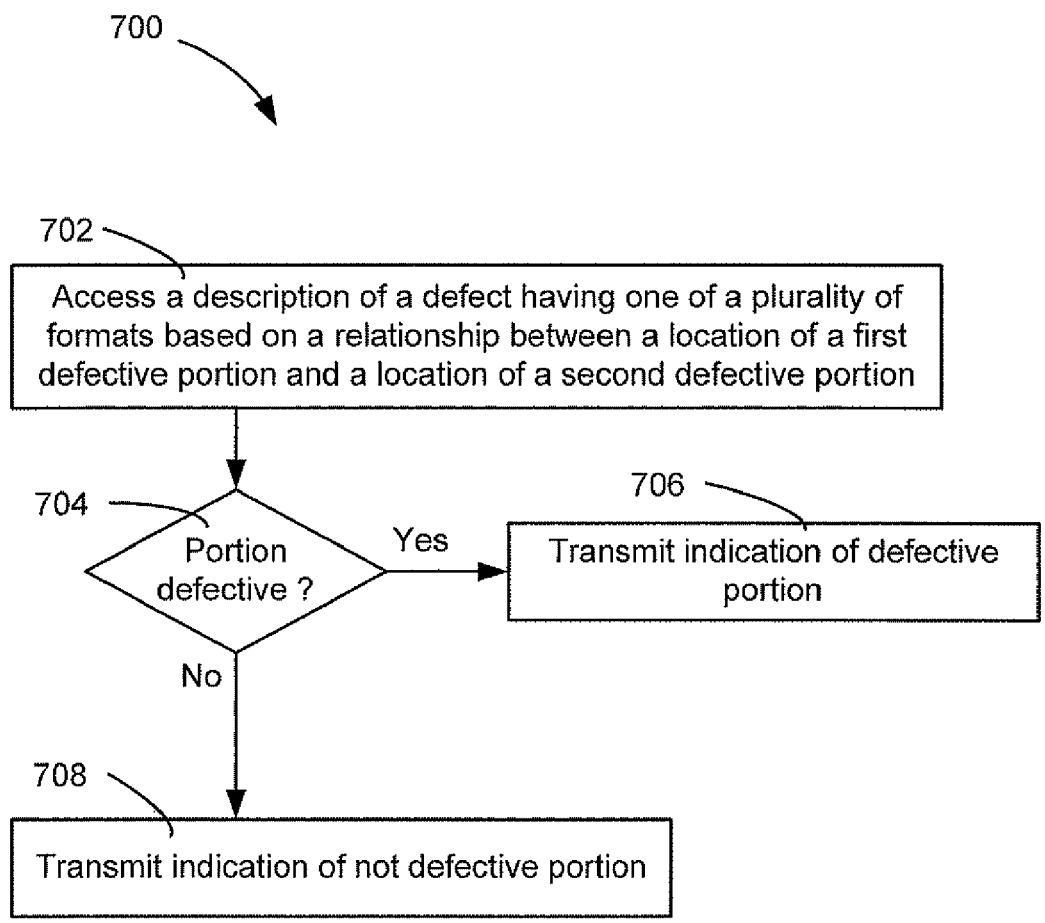
FIG. 7 is a flow diagram of a second embodiment of a method of defect description of a data storage medium.

Referring to FIG. 7, a flow diagram of a third embodiment of a method of defect description of a data storage medium is depicted and generally designated 700. The method 700 includes accessing a defect description table of a data storage medium, at 702. The defect description table may include defect description data in a plurality of distinct formats. Each entry of the defect description table may have one of the plurality of distinct formats. Each of the plurality of distinct formats may be based on a relationship between a location of a first defective portion of the data storage medium and a location of a second defective portion of the data storage medium.

The method 700 may also include determining when a portion of the data storage medium is defective based on the defect description table, at 704. In a particular embodiment, the data storage medium includes data tracks. The plurality of distinct formats may include a first format for a single entry that describes defective portions that have the same position within each of a plurality of adjacent tracks and a second format for a single entry that describes a plurality of defective portions in a single track.

In a particular embodiment, the first format may include a field for storing data that represents a unique identifier for each entry, a field for storing data that represents a track identification, a field for storing data that represents a starting position of one or more defective sectors on a first track and a number of consecutive sectors after the starting position that are defective on the first track, and a field for storing data that represents a number of adjacent tracks having an identical one or more defective sectors.

In another particular embodiment, the second format may include a field for storing data that represents a unique identifier for each entry, a field for storing data that represents a track identification, and multiple fields for storing data that each represent a starting position of one or more defective sectors on a second track and a number of consecutive sectors after the starting position that are defective on the second track.

In a particular embodiment, the identification of a portion of the data storage medium in the defect description table may be an indication that the portion is defective, in which case, an indication that the portion of the data storage medium may be defective may be transmitted, at 706. When the portion may be not identified in the defect description table, an indication that the portion may be not defective may be transmitted, at 708.

In accordance with various embodiments, the methods described herein may be implemented as one or more software programs running on a computer processor or controller, such as the controller 220. In accordance with another embodiment, the methods described herein may be implemented as one or more software programs running on a host device, such as a PC that is using a disc drive. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   determining, with a controller, a first defect of a data storage medium;
   selecting, via the controller, a format of an entry for a defect description table based on the first defect from one of at least three formats determined to result in a least number of entries in the defect description table; and
   storing, via the controller, a description of the first defect in the entry for the defect description table in a first format of the at least three formats, wherein a format comprises a set of defined fields to store data in, and wherein the first format comprises:
   a field for storing data that represents a track identification;
   multiple fields for storing data that each represent a starting position of one of multiple, non-adjacent defects on a second track; and
   multiple fields for storing data that each represent a number of defective consecutive sectors after a specific starting position of one of the multiple, non-adjacent defects on the second track.

2. The method of claim 1, further comprising selecting, via the controller, a second format when a second defect has a substantially similar position within an adjacent track.

3. The method of claim 2, wherein the substantially similar position comprises an identical starting location and an identical sector span of the first defect and of the second defect.

4. The method of claim 2, wherein the second format comprises:
   a field for storing data that represents a unique identifier for each entry in the second format;
   a field for storing data that represents a track identification;
   a field for storing data that represents a starting position of one or more defective sectors on a first track
   a field for storing data that represents a number of consecutive sectors after the starting position that are defective on the first track; and
   a field for storing data that represents a number of adjacent tracks having defective sectors that have a substantially similar defective sector starting position as the first track and a substantially similar number of defective consecutive sectors after the starting position as the first track.

5. The method of claim 1, wherein the first format is configured to store data that represents multiple, non-adjacent defects of a single track in a single entry of the defect description table, the first format selected from the at least three formats when a second defect occurs in a same track as the first defect.

6. The method of claim 5, wherein the first format further comprises:
   a field for storing data that represents a unique identifier for each entry in the first format.

7. The method of claim 6, further comprising storing, via the controller, the description of the first defect in a third format selected from the at least three formats.

8. The method of claim 7 further comprising storing, via the controller, the description of the first defect in the third format when the first defect can not be stored in the first format or the second format.

9. The method of claim 7, wherein the third format comprises:
   a field for storing data that represents a unique identifier for each entry in the third format;
   a field for storing data that represents a track identification; and
   a field for storing data that represents a single defective sector.

10. A device comprising:
    a data storage medium;
    a controller coupled to the data storage medium and configured to:
    determine when a portion of the data storage medium is defective based on a defect description table;
    select one data configuration from at least three predefined data configurations to store data representing a first defect, where a data configuration comprises a recognized structure to store data according to, wherein a first predefined data configuration comprises a structure to allow a description of defects that have the same position within each of a plurality of adjacent tracks to be stored, a second data configuration comprises a structure to allow a description of a plurality of non-adjacent defects in a single track to be stored, and a third data configuration comprises a structure to allow a description of a single defect in a single track to be stored; and
    store a description of the first defect in a defect description table in the selected data configuration.

11. The device of claim 10 further comprising:
    a memory accessible by the controller; and
    wherein the defect description table is stored in the memory.

12. The device of claim 11, wherein the data storage medium is a magnetic disc.

13. The device of claim 10, wherein the defect description table comprises multiple tables and each of the multiple tables comprises a structure as defined by one of the at least three predefined data configurations.

14. A non-transitory computer readable medium having instructions to cause a processor to execute a method comprising:
accessing a defect description table of a data storage medium, wherein the defect description table includes defect description data stored in a plurality of sub-tables;
determining when a portion of the data storage medium is defective based on the defect description table;
wherein a first sub-table has a first data configuration that comprises a first structure to allow a description of defects that have the same position within each of a plurality of adjacent tracks to be stored;
wherein a second sub-table of the multiple tables has a second data configuration that comprises a second structure to allow a description of a plurality of non-adjacent defects in a single track to be stored; and
wherein a third sub-table of the multiple tables has a third data configuration that comprises a third structure to allow a description of a single defect in a single track to be stored.

15. A device comprising a processor coupled to a memory comprising a defect description table that identifies a portion of a data storage medium that is defective, the defect description table comprising multiple sub-tables, each of the sub-tables comprising a unique data structure to allow the processor to store data representing a defect, wherein a first sub-table comprises a first data structure to allow a description of defects that span multiple adjacent tracks and have a substantially similar position within each of the multiple adjacent tracks to be stored in a single entry, a second sub-table comprises a second data structure to allow a description of a plurality of non-adjacent defects in a single track to be stored in a single entry, and a third sub-table comprises a third data structure to allow a description of a single sector defect in a single track to be stored in a single entry.

16. The device of claim 15 further comprising:
each entry in a respective sub-table is stored in a unique data structure of the respective sub-table and comprises data that represents a defect;
the processor is configured to determine positions of defects on the data storage medium based on the defect description table;
the processor is configured to add entries to the defect description table when a defective position on the data storage medium is detected; and
the processor is configured to store the defect description table after it has been updated to the memory.

17. The device of claim 16 further comprising:
wherein the unique data structure of the first sub-table comprises:
a field for storing data that represents a unique identifier for each entry in the first data structure;
a field for storing data that represents a track identification;
a field for storing data that represents a starting position of one or more defective sectors on a first track;
a field for storing data that represents a number of consecutive sectors after the starting position that are defective on the first track;
a field for storing data that represents a number of adjacent tracks having defective sectors that have a substantially similar defective sector starting position as the first track and a substantially similar number of defective consecutive sectors after the starting position as the first track;
wherein the unique data structure of the second sub-table comprises:
a field for storing data that represents a unique identifier for each entry in the second data structure;
a field for storing data that represents a track identification; and
multiple fields for storing data that each represent a starting position of one of multiple, non-adjacent defects on a second track; and
multiple fields for storing data that each represent a number of defective consecutive sectors after a specific starting position of one of the multiple, non-adjacent defects on the second track;
wherein the unique data structure of the third sub-table comprises:
a field for storing data that represents a unique identifier for each entry in the third data structure;
a field for storing data that represents a track identification; and
a field for storing data that represents a single defective sector.

* * * * *